(No Model.)
M. LOREE.
TRUCK.
No. 380,335. Patented Apr. 3, 1888.
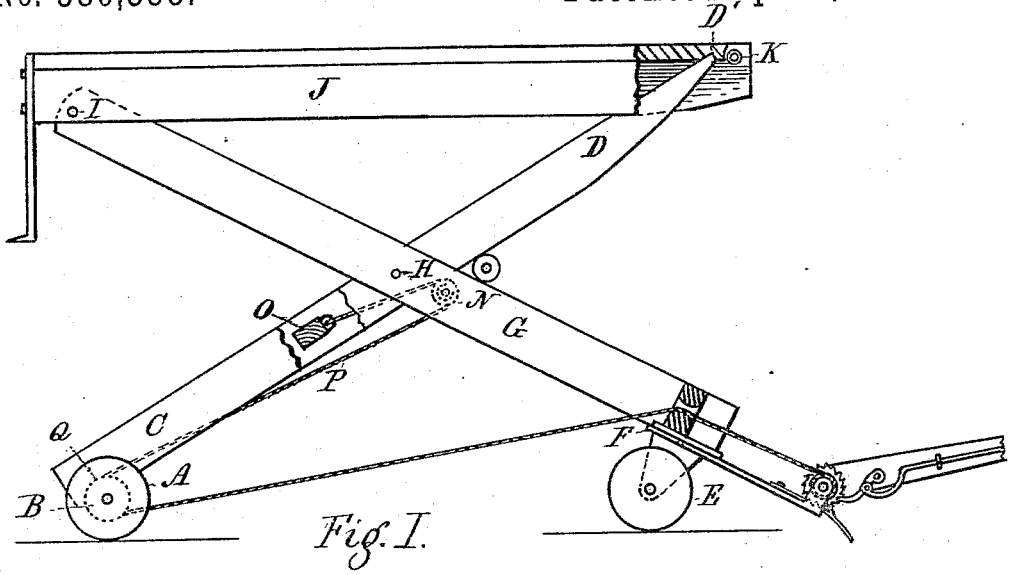
Fig. I.
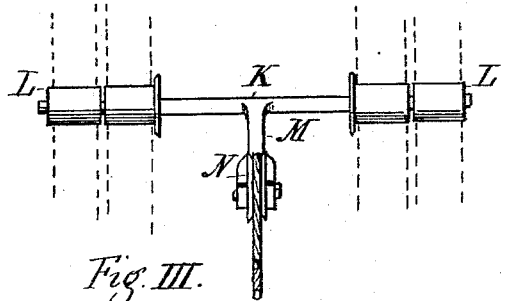
Fig. III.
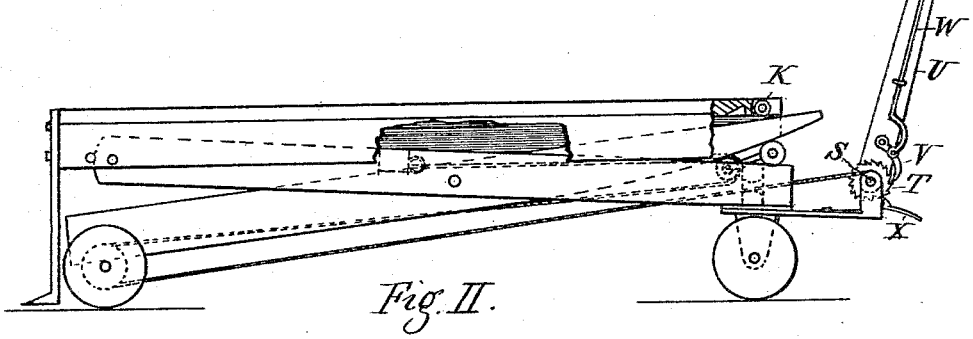
Fig. II.
WITNESSES:
Robt. S. Millar
Robert Kirk
INVENTOR:
Manfred Loree.
Attorney.
N. PETERS, Photo-Lithographer, Washington, D. C.

United States Patent Office.

MANFRED LOREE, OF MIAMISBURG, OHIO, ASSIGNOR OF TWO-THIRDS TO DAVID P. CLARK, OF SAME PLACE, AND CHARLES E. CLARK, OF DAYTON, OHIO.

TRUCK.

SPECIFICATION forming part of Letters Patent No. 380,335, dated April 3, 1888.

Application filed September 7, 1887. Serial No. 248,956. (No model.)

*To all whom it may concern:*

Be it known that I, MANFRED LOREE, of Miamisburg, in the county of Montgomery and State of Ohio, have invented a new and useful Improvement in Elevating-Trucks and Carriers, which improvement is fully set forth in the following specification and accompanying drawings, in which—

Figure 1 is a side view, partly in section, of my improved elevating-truck and carrier, showing the platform elevated and in position for carrying articles; Fig. 2, a view of the same with the platform lowered and the elevating-lever in position for raising the platform, and Fig. 3 a perspective view of the roller and yoke.

The object of my invention is to construct an elevating-truck and carrier or an apparatus for raising and transporting barrels, boxes, and other heavy articles, or it may be used as a conveyer and elevator for trunks and boxes which are to be loaded into cars; and it consists of a platform mounted on bars which are pivoted centrally, the lower ends of said bars being mounted on several wheels, and a roller and yoke placed between the ends of these bars and attached to tackle, so that the platform may be elevated by means of a crossed ratchet and pawl, the lever at the same time being used as a tongue for the truck for transporting it from place to place, all of which will now be fully set forth in detail.

In the accompanying drawings, A represents the rear wheel, having an axle, B, either attached so as to turn with the wheel or secured rigidly to the truck. These wheels and axle are designed for the rear end of the truck. This axle has near each end mounted thereon the rear end of the bar C, the forward end of which has its under side curved upwardly, as shown at D, terminating in a point. The fore wheel, E, of which there may be one or two, carries a swivel, F, on which are mounted the forward ends of bars G. These bars are centrally separated and extend backward so as to rest on the rear axle, B, and in position alongside of the bars C, but on the outside of said bars C. Midway between the forward and rear wheels these bars are pivoted at H, and the rear ends of the bars G are hinged at I to the rear end of the platform J. The forward end of the platform has a friction-roller, K, which rests on the forward ends of the bars C K represents a bar having two rollers, L, at each end. Centrally there is a rearwardly-projecting arm, M, carrying a grooved pulley, N. This roller-bar is placed between the forward ends of the bars C G, with the arm M projecting rearwardly between the bars C G.

O represents a cross-beam between the two bars C at a point rearwardly of the pivotal point H, and to this cross-bar is attached one end of a rope, P. This rope passes forward around the grooved pulley N, hence rearwardly around the pulley Q on the rear axle, B, thence forwardly to the windlass S. One end of the windlass has a ratchet-pulley, T, and on the shaft of the windlass is hinged a handle or tongue, U, by means of which the truck is moved from place to place, and this tongue carries on one side a pawl, V, and a disengaging-spring, W, so that as the tongue is vibrated to and fro the pawl V will engage with the teeth of the ratchet-wheel T and cause the rope P to sway the roller-bar K rearwardly between the crossed ends of the bars C G, and thus elevate the platform. A pawl, X, on the lower side of the ratchet T prevents the pawl from being reversed as the handle U is reciprocated. When the platform is raised to its highest point, the point D' of the bar C rests against the roller K, and thus holds the same in position. One of the rollers L rests against the bar G and rolls in one direction, while the other roller rests against the bar C and rolls in the opposite direction.

It is obvious that this may be used for a variety of purposes—such as, for instance, in lifting barges, boats, or other floating materials from the water to the ways.

What I claim as new is—

1. In an elevating-truck and carrier, the crossed bars centrally pivoted and mounted at their opposite ends on wheels, and having a roller-bar interposed between their forward ends and connected with rope and pulleys and windlass for elevating the truck, substantially as herein set forth.

2. In an elevating-truck and carrier, the combination of the bars C G, centrally pivoted and having their opposite ends mounted on transporting-wheels and at their other ends carrying a platform, J, in combination with the roller-bar K, having a rope, P, and windlass, with the vibrating handle U, substantially as herein set forth.

In testimony that I claim the foregoing I have hereunto set my hand, this 30th day of July, 1887, in the presence of witnesses.

MANFRED LOREE.

Witnesses:
 WM. LEIS,
 LEWIS H. ZEHRING.